US009838996B2

(12) United States Patent
Bischinger et al.

(10) Patent No.: US 9,838,996 B2
(45) Date of Patent: Dec. 5, 2017

(54) ESTIMATING THE GEOGRAPHICAL DISTANCE OR A RANGE OF THE GEOGRAPHICAL DISTANCE BETWEEN AT LEAST TWO USER EQUIPMENTS

(71) Applicant: Deutsche Telekom AG, Bonn (DE)

(72) Inventors: Kurt Bischinger, Vienna (AT); Axel Klatt, Cologne (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 15/312,681

(22) PCT Filed: May 12, 2015

(86) PCT No.: PCT/EP2015/060498
§ 371 (c)(1),
(2) Date: Nov. 21, 2016

(87) PCT Pub. No.: WO2015/177002
PCT Pub. Date: Nov. 26, 2015

(65) Prior Publication Data
US 2017/0188330 A1     Jun. 29, 2017

(30) Foreign Application Priority Data

May 23, 2014 (EP) .................................... 14169728
Jun. 16, 2014 (EP) .................................... 14172493

(51) Int. Cl.
*H04W 24/00* (2009.01)
*H04W 4/00* (2009.01)
(Continued)

(52) U.S. Cl.
CPC ......... *H04W 64/006* (2013.01); *H04W 8/005* (2013.01); *H04W 52/283* (2013.01)

(58) Field of Classification Search
None
See application file for complete search history.

(56) References Cited

U.S. PATENT DOCUMENTS

2008/0280625 A1    11/2008   Larsen
2014/0050319 A1    2/2014    Pang et al.
2015/0139213 A1*   5/2015    Abraham ................ H04L 69/28
                                                              370/338

FOREIGN PATENT DOCUMENTS

WO    WO 2013108114 A1    7/2013

* cited by examiner

*Primary Examiner* — Erika Washington
(74) *Attorney, Agent, or Firm* — Leydig, Voit & Mayer, Ltd.

(57) ABSTRACT

A method for estimating a geographical distance between at least two user equipments includes: generating, by a first user equipment, a discovery message, wherein the discovery message comprises a transmission power information; transmitting, by the first user equipment, the discovery message using a common air interface of the first user equipment and the second user equipment, using the level of transmission power; receiving, by the second user equipment, the discovery message comprising the transmission power information and determining a level of reception power; and determining, by the second user equipment, based on the received transmission power information and the determined level of reception power, an estimation related to the geographical distance between the first user equipment and the second user equipment, or to a range of the geographical distance out of a plurality of different ranges of the geographical distance between the first user equipment and the second user equipment.

12 Claims, 1 Drawing Sheet

(51) Int. Cl.
*H04W 64/00* (2009.01)
*H04W 8/00* (2009.01)
*H04W 52/28* (2009.01)

ESTIMATING THE GEOGRAPHICAL DISTANCE OR A RANGE OF THE GEOGRAPHICAL DISTANCE BETWEEN AT LEAST TWO USER EQUIPMENTS

CROSS-REFERENCE TO RELATED APPLICATIONS

This application is a U.S. National Phase application under 35 U.S.C. §371 of International Application No. PCT/EP2015/060498, filed on May 12, 2015, and claims benefit to European Patent Application No. EP 14169728.4, filed on May 23, 2014, and to European Patent Application No. EP 14172493.0, filed on Jun. 16, 2014. The International Application was published in English on Nov. 26, 2015 as WO 2015/177002 A1 under PCT Article 21(2).

FIELD

The present invention relates to a method for estimating the geographical distance or for estimating a range of the geographical distance between at least two user equipments via transmitting at least one discovery message for device to device communication from a first user equipment to at least one second user equipment.

Furthermore, the present invention relates to a system for estimating the geographical distance or for estimating a range of the geographical distance between at least two user equipments via transmitting at least one discovery message for device to device communication from a first user equipment to at least one second user equipment.

Furthermore, the present invention relates to a mobile communication network, a user equipment, a program and a computer program product.

The present invention addresses, inter alia, a method allowing at least two mobile terminal devices (or user equipments) that are capable of establishing a direct communication link between these devices (or user equipments)—hereinafter called device-to-device communication or device to device communication or D2D communication—to discover each other, i.e. initially exchange information directly between these devices.

BACKGROUND

It is expected that the LTE (Long Term Evolution) system will allow for an increased usage of device to device communication. The LTE system and LTE-A (LTE Advanced) system comprises the Evolved Universal Mobile Telecommunications System (UMTS) Terrestrial Radio Access Network (E-UTRAN), and the Evolved Packet Core (EPC). The E-UTRAN typically comprises a plurality of base station entities, typically referred to as eNBs (evolved NodeBs) for macro-cells and HeNBs (Home-eNBs) for femto-cells, as well as the cellular terminals (or user equipments).

Device to device communication is currently being defined as a work item in the context of 3GPP (Third Generation Partnership Project), Release 12. The basic principle of LTE device to device communication (LTE D2D) is the possibility to allow for a direct communication between at least two devices (or user equipments) supporting a device to device communication mode. Within the context of the device to device communication, standardized in 3GPP, two modes are part of the 3GPP definitions: an infrastructure-based device to device communication mode and a direct device to device communication mode.

A further feature of the device to device communication is the so-called "discovery" functionality which allows at least two device-to-device-communication-enabled devices (or user equipments) to identify each other if these devices (or user equipments) are in the vicinity of each other. Within the context of the so-called "communication" functionality, the at least two device-to-device-communication-enabled devices involved in the discovery are enabled to initiate a direct communication between each other.

The discovery feature is of interest to critical communication users as well as commercial cellular mobile operators in order to explore new business opportunities with targeted mobile advertising as well as supporting the growing trend of social networking where the environment of the current location of the user equipment (i.e. the proximity of the current location) plays a more and more important role. Additionally, device to device communications, and especially proximity services, are likewise interesting for automotive applications in order to establish new services, e.g., for car-to-car communication, traffic management and traffic alert.

The device to device discovery and/or device to device communication allows for direct interactions between at least two devices based on radio resources being allocated to the devices by the supporting mobile communication network. Typically, the mobile communication network is involved in determining the location of devices in order to provide location based services. For example, the location of one device may be provided, by the supporting mobile communication network, to another device such that an absolute position may be used to determine a relative distance between the devices, which typically requires a centralized system for the determination of the relative distance. However, this might lead to situations in which the network load increases with increasing number of relative distances to be determined by the mobile communication network. Furthermore, the usage of device-to-device communication is limited due to reception failures or weak signals related to the communication of the devices with the supporting mobile communication network, in particular in public safety applications.

SUMMARY

In an embodiment, the invention provides a method for estimating a geographical distance or a range of the geographical distance between at least two user equipments via transmitting a discovery message for device to device communication from a first user equipment to a second user equipment, the first user equipment and the second user equipment being enabled to use a device to device communication mode including proximity detection and/or discovery, wherein the method includes the following steps: in a first step, generating, by the first user equipment, the discovery message, wherein the discovery message comprises a transmission power information, the transmission power information being indicative of a level of transmission power for transmitting the discovery message; in a second step, transmitting, by the first user equipment, the discovery message using a common air interface of the first user equipment and the second user equipment, wherein the level of transmission power is used by the first user equipment to transmit the discovery message; and in a third step, receiving, by the second user equipment, the discovery message comprising the transmission power information and determining a level of reception power. The method further includes: determining, by the second user equipment, based on the received transmission power information and the determined level of reception power, an estimation related to the geographical distance between the first user equipment and the second user equipment, or to a range of the geographical distance out of a plurality of different ranges of the geographical distance between the first user equipment and the second user equipment.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
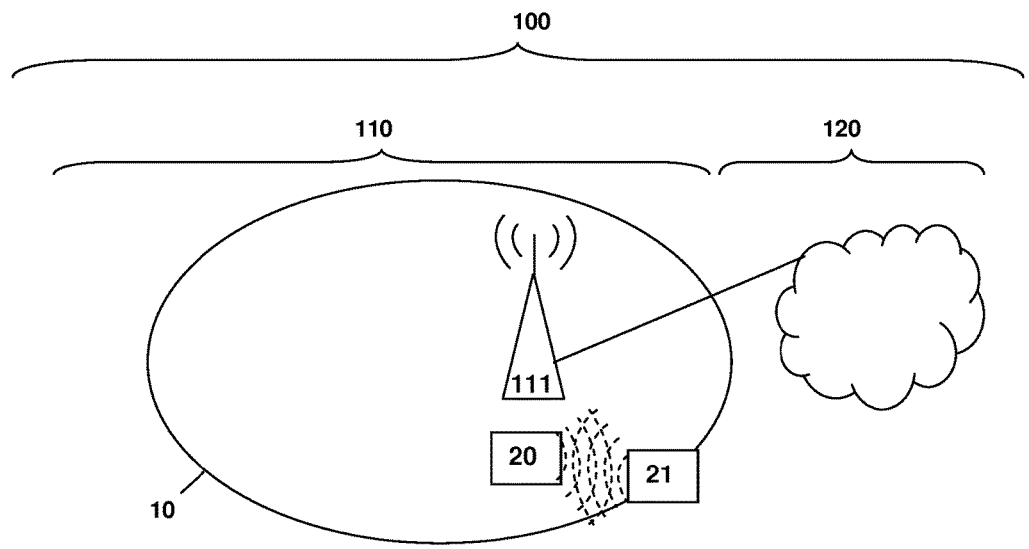
FIGS. 1 and 2 schematically illustrate a system according to the present invention.

Embodiments of the present invention enable the estimation of the geographical distance or a range of the geographical distance between at least two user equipments via transmitting at least one discovery message for device to device communication from a first user equipment to at least one second user equipment, wherein the use of the second user equipment is enhanced—especially with respect to new use cases—and/or wherein limitations in the use of the device to device discovery—especially due to reception failures or other signal disturbances—are reduced and/or overcome.

In an embodiment, the present invention provides a method for estimating the geographical distance or for estimating a range of the geographical distance between at least two user equipments via transmitting at least one discovery message for device to device communication from a first user equipment to at least one second user equipment, the first user equipment and the second user equipment being enabled to use a device to device communication mode (D2D mode) including proximity detection and/or discovery, wherein the method comprises the following steps:

in a first step, the discovery message is generated by the first user equipment, wherein the discovery message comprises a transmission power information, the transmission power information being indicative of the level of the transmission power used by the first user equipment for transmitting the discovery message, in a second step, the discovery message is transmitted, by the first user equipment, using a common air interface of the first user equipment and the second user equipment, wherein the level of transmission power is used by the first user equipment to transmit the discovery message, in a third step, the discovery message, comprising the transmission power information, is received by the second user equipment, and a level of reception power is determined, wherein based on the received transmission power information and the determined level of reception power, an estimation related to the geographical distance, or to a range of the geographical distance out of a plurality of different ranges of the geographical distance between the first user equipment and the second user equipment is determined by the second user equipment.

It is thereby advantageously possible to determine the estimation related to the geographical distance or the range of the geographical distance between the first and user equipment and the second user equipment in such a manner that—with respect to the state of the art—network load is reduced and/or such that proximity services are provided even without network coverage. For example, it is advantageously possible to determine the estimation related to the geographical distance or the range of the geographical distance directly, in particular independent of the reception quality of signals received from the supporting mobile communication network. Furthermore, it is advantageously possible, with respect to the state of the art, to enhance existing uses cases and/or realize new use cases. Preferably, the second user equipment may use the estimation related to the geographical distance or the estimation related to the range of the geographical distance for making a selection related to the first user equipment based on a velocity of the second user equipment. The selection related to the first user equipment includes, for example, a determination whether an information regarding the first user equipment is used by the second user equipment. According to one example, at a speed typically being used by pedestrians, a shop being located within a threshold distance (of e.g. 100 meters) from the second user equipment away, may be selected (and/or displayed to a user) by the second user equipment, whereas another shop within another distance (of e.g. 1 kilometer) may be de-selected (and/or not displayed to a user) by the second user equipment. According to another example, at a speed typically being used by a vehicle (e.g. a bicycle), an automated teller machine (ATM) being located within a threshold distance of 500 meters may be selected for further processing by the second user equipment. Preferably, the second user equipment is enabled to differentiate between a first case, wherein the geographical distance or range of the geographical distance is relatively small and the first user equipment uses a relatively low level of the transmission power, and a second case, wherein the geographical distance or range of the geographical distance is relatively large and the first user equipment uses a relatively large level of the transmission power, and wherein, in both of these two cases, the determined level of reception power is substantially the same. In order to inform the receiving second user equipment about the level of transmission power being used by the announcing first user equipment for the transmission of the discovery message, the transmission power information (i.e. the transmission power level or an indication related to the used transmission power level) is enclosed in the discovery message. Preferably, the second user equipment is thereby enabled to compare the determined level of transmission power with the level of transmission power being transmitted within the discovery message such as to determine the geographical distance or range. It is thereby furthermore advantageously possible to enable each of a plurality of second user equipments to determine one geographical distance or range of the geographical distance to the first user equipment. Preferably, a range of the geographical distance includes interval information indicating a lowest and highest value of a geographical distance. Preferably, the estimation related to the geographical distance or to the range of the geographical distance is indicated, by the second user equipment, to an application (running typically on the second user equipment) requesting the estimation related to the geographical distance or to the range of the geographical distance. For example, the estimation related to the geographical distance or to the range of the geographical distance is indicated to the application in form of a numerical value specifying an absolute or relative value of the geographical distance or in the form of an indication—in particular a single Bit (binary digit) indication or an indication comprising a plurality of bits—that the estimated distance falls within a discovery range requested by the application.

According to a preferred embodiment of the present invention, the transmission power information comprises an indication of the level of transmission power in the form of a numerical value—in particular using a predetermined transmission power unit such as, for example, decibel-milliwatts (dBm)—or in the form of a range information indicating a range of levels of transmission powers such that it is possible to reduce the number of binary digits (Bits) being needed for the transmission of the transmission power information.

According to a preferred embodiment of the present invention, the estimation related to the geographical distance or range of geographical distances is determined by calculating a path loss information related to a decrease of the power transmission from the level of the transmission power to a further level of transmission power along a path of the discovery message from the first user equipment to the second user equipment. In particular, the path loss information includes a path loss value being related to a difference between the level of the transmission power and the further level of the transmission power.

According to a preferred embodiment of the present invention, the first and second user equipment are related to a mobile communication network comprising a core network and an access network, the access network of the mobile communication network comprising at least one radio cell being served by a base station entity, the radio cell corresponding to the radio coverage area of the base station entity, wherein a transmission power calibration information is transmitted by the base station entity, wherein the transmission power calibration information is received by the first user equipment, the transmission power calibration information being indicative of the level of transmission power to apply, by the first user equipment, for transmitting the discovery message, wherein preferably the transmission power calibration information is transmitted, by the base station entity, using a control channel, preferably the broadcast control channel or a dedicated control channel for individual control of a specific user equipment.

Thereby, it is advantageously possible to use the transmission power calibration information for determining the estimation related to the geographical distance or range of the geographical distance with relatively high precision. Preferably, the transmission power calibration information comprises a calibration table being provided by the eNB to the announcing first user equipment such that the variation of transmission distance ranges of the discovery message are reduced with respect to different first user equipments, in particular within the radio cell. For example, the transmission power calibration information is transmitted using a System Information Block (SIB) on the broadcast channel (BCCH) or via dedicated signalling using radio resource control (RRC) signalling. Preferably, the level of power transmission is adjusted by the first user equipment depending on the power calibration information such that a specific (requested) transmission distance range is realized.

According to a further preferred embodiment of the present invention, the base station entity is configured to limit the level of the transmission power to a maximum level of transmission power of the first user equipment per cell. Thereby, it is advantageously possible to prevent interferences. In particular, the maximum level of transmission power is signalled to the first user equipment using a System Information Block (SIB) on the broadcast control channel (BCCH). Preferably, the mobile communication network defines the maximum level of the transmission power for each radio cell separately. According to the present invention, the use of radio cell specific transmission power calibration information, advantageously allows for avoidance of changes of the transmission distance range upon change of the radio cell by the first user equipment. It is thereby advantageously possible, by the mobile communication network, to authorize a subscriber of the first user equipment to use only predetermined transmission distance ranges within the mobile communication network, i.e. prescribe a maximum transmission distance range the subscriber is allowed to use.

According to a further preferred embodiment of the present invention, the transmission power calibration information refers to at least a first level of transmission power and to a second level of transmission power, to be alternatively applied, by the first user equipment, for transmitting the discovery message, wherein the first level of transmission power refers to a first transmission distance range of the discovery message and wherein the second level of transmission power refers to a second transmission distance range of the discovery message, the second level of transmission power and the second transmission distance range being superior to the first level of transmission power and the first transmission distance range, wherein preferably the transmission power calibration information refers, besides the first level of transmission power and the second level of transmission power, to at least a third level of transmission power, one of the first, second and third level of transmission power being alternatively applied, by the first user equipment, for transmitting the discovery message, wherein the third level of transmission power refers to a third transmission distance range of the discovery message, and wherein the first transmission distance range refers to a comparably short transmission distance of the discovery message, the second transmission distance range refers to a medium transmission distance of the discovery message, and the third transmission distance range refers to a comparably long transmission distance of the discovery message.

Thereby, it is advantageously possible to map levels of transmission power to transmission distance ranges. Preferably, the levels of transmission power are mapped to the transmission distance ranges per cell, in particular depending on the type of the radio cell (for example a rural type or an urban type of the radio cell). Accordingly, in two different cells, different levels of transmission power may be assigned to a given transmission distance range. Thereby, it is advantageously possible to compensate different radio signal propagation conditions while keeping a particular transmission distance constant across the mobile communication network or a set of different radio cells.

According to a preferred embodiment of the present invention, the transmission power calibration information is configured such that a range of levels of transmission power (i.e. between 0 and the maximum level of transmission power) is divided into a number of subsections, preferably less than 15 sections (or intervals), more preferably less than 9 sections, even more preferably less than 4 sections. For example, in case that the range of levels of transmission power is divided into three sections, it is advantageously possible to transmit the transmission power information via using only three Bits, preferably two Bits, of the discovery message.

According to a further preferred embodiment of the present invention, the transmission power calibration information is also received by the second user equipment, the transmission power calibration information being indicative of radio conditions within the radio cell, wherein the estimation related to the geographical distance or to a range of the geographical distance between the first user equipment and the second user equipment is determined based on
    the transmission power calibration information, and on
    the received transmission power information and the determined level of reception power.

Thereby, it is advantageously possible to take into account radio conditions of the at least one radio cell and/or the type of the at least one radio cell (for example, a rural type of cell or an urban type of the cell) for the determination of the estimation related to the geographical distance or to the range of geographical distance. In particular, variations of transmission distance ranges due to different radio conditions in different cells are substantially reduced, when the level of power transmission is controlled according to the transmission power calibration information.

According to a preferred embodiment of the present invention, the transmission power calibration information is generated by the mobile communication network depending on a determination of the radio conditions in the radio cell. Preferably, the determination of radio conditions in the radio cell comprises using, by the base station entity, configuration data received from one or more neighbouring base station entities and/or using information collected by terminal measurements, in particular via using Minimization of Drive test (MDT) techniques for characterization of the radio conditions in the radio cell.

According to a further preferred embodiment of the present invention, the first and second user equipment are related to a mobile communication network comprising a core network and an access network, the access network of the mobile communication network comprising at least one radio cell being served by a base station entity, the radio cell corresponding to the radio coverage area of the base station entity, wherein an information indicative of radio conditions within the radio cell is transmitted by the base station entity, wherein the estimation related to the geographical distance or to a range of the geographical distance between the first user equipment and the second user equipment is determined based on
    the information indicative of the radio conditions within the radio cell, and on
    the received transmission power information and the determined level of reception power.

Thereby, it is advantageously possible to provide the information indicative of radio conditions within the radio cell—preferably directly—from the mobile communication network to the second user equipment. The second user equipment is thereby preferably enabled to determine the estimation related to the geographical distance or the range of the geographical distance independent of limitations of the level of transmission power being set by the mobile communication to the first user equipment.

According to a further preferred embodiment of the present invention, the discovery message comprises an indication of a geographic location of the first user equipment and/or an identification information identifying
    the first user equipment and/or
    the subscriber of the first user equipment and/or
    an application and/or
    a category.

Thereby, it is advantageously possible for the second user equipment to identify the first user equipment such that the second user equipment is enabled to relate the identification information to the estimation related to the geographical distance or range of the geographical distance. Preferably, the second user equipment is configured to display, in particular on a map, the geographical distance or the range of the geographical distance depending on the identification information.

According to a further preferred embodiment of the present invention, the discovery message comprises, besides the transmission power information, an indication that the discovery message comprises a transmission power information, wherein preferably the discovery message comprises, besides the transmission power information, a further information indicative of radio conditions within the radio cell.

Thereby, it is advantageously possible to enable the second user equipment to analyse the discovery message in a relatively simple manner by executing an estimation algorithm being adapted to determine the estimation related to the geographical distance or the range of the geographical distance (only) in case that the discovery message comprises the indication that the discovery message comprises transmission power information. In other cases, the second user equipment preferably avoids the execution of the estimation algorithm. It is furthermore advantageously possible according to the present invention that, via including the further information indicative of radio conditions in the discovery message, the second user equipment is informed about the radio conditions within the radio cell directly by the first user equipment. For example, in case that the second user equipment is unable to listen to the broadcast control channel (BCCH) of the radio cell the first user equipment is camping on, the first user equipment enables the second user equipment—via transmission of the further information indicative of radio conditions within the radio cell—to determine the estimation related to the geographical distance or to the range of the geographical distance depending on the radio conditions of the cell.

According to a further preferred embodiment of the present invention, the discovery message comprises an expression according to the 3GPP Proximity Services (ProSe) standard.

Thereby, it is advantageously possible to use the expression according to the 3GPP Proximity Services (ProSe) standard for device to device communication such that a direct discovery is enabled between the first and second user equipment independent of a connection of the first and/or second user equipment to the mobile communication network. Preferably, the expression is used in order to exchange the transmission power information directly within a discovery procedure executed in a device to device communication mode rather than establishing a device to device communication connection between the first and second user equipment and/or using the mobile communication network. Therefore, it is especially advantageously possible to transmit the transmission power information in a relatively simple, fast and reliable manner from the first to the second user equipment.

According to a further preferred embodiment of the present invention, the discovery message comprises, besides the expression, a header information, wherein the header information comprises the transmission power information, and/or the discovery message comprises, besides the expression and the header information, an additional information, wherein the additional information comprises the transmission power information.

In case that the discovery message comprises an expression according to the 3GPP Proximity Services (ProSe) standard, it is preferred that the discovery message comprises, besides the expression, the header information. It is preferred according to an embodiment of the present invention that the transmission power information is part of or included in the header information (i.e. as part of the discovery message). This means, in particular, that the transmission power information is—according to such an alternative—not part of or excluded from the expression of the discovery message, i.e. excluded from the expression part of the discovery message. According to an alternative preferred embodiment, the transmission power information is not part of the header information (of the discovery message) but part of the expression (of the discovery message). According to still another alternative embodiment, the transmission power information is part both of the header information (of the discovery message), and of the expression (of the discovery message).

In case that the discovery message comprises an expression according to the 3GPP Proximity Services (ProSe) standard, it is furthermore preferred that the discovery message comprises, besides the expression and the header information, an additional information. According to such an embodiment, the transmission power information is neither part of the header information (of the discovery message), nor part of the expression (of the discovery message), but part of the additional information of the discovery message. However, it is possible according to the present invention that the transmission power information is part, both, of the additional information (of the discovery message), and of one or both of the header information (of the discovery message) and the expression (of the discovery message).

Furthermore, the present invention relates to a system for estimating the geographical distance or for estimating a range of the geographical distance between at least two user equipments via transmitting at least one discovery message for device to device communication from a first user equipment to at least one second user equipment, the system comprising the first user equipment and the second user equipment, the first user equipment and the second user equipment being enabled to use a device to device communication mode (D2D mode) including proximity detection and/or discovery, wherein the system is configured such that:

the discovery message is generated by the first user equipment, wherein the discovery message comprises a transmission power information, the transmission power information being indicative of the level of the transmission power used by the first user equipment for transmitting the discovery message, the discovery message is transmitted, by the first user equipment, using a common air interface of the first user equipment and the second user equipment, wherein the level of transmission power is used by the first user equipment to transmit the discovery message, the discovery message, comprising the transmission power information, is received by the second user equipment, and a level of reception power is determined, wherein based on the received transmission power information and the determined level of reception power, an estimation related to the geographical distance, or to a range of the geographical distance out of a plurality of different ranges of the geographical distance between the first user equipment and the second user equipment is determined by the second user equipment.

It is thereby advantageously possible to provide a system for a direct determination of the estimation related to the geographical distance or the range of the geographical distance between the first and user equipment and the second user equipment, in particular for a determination independent of the reception quality of signals received from the supporting mobile communication network. Preferably, the second user equipment is thereby enabled to differentiate between a first case, wherein the geographical distance or range of the geographical distance is relatively small and the first user equipment uses a relatively low level of the transmission power, and a second case, wherein the geographical distance or range of the geographical distance is relatively large and the first user equipment uses a relatively large level of the transmission power, and wherein, in both of these two cases, the determined level of reception power is substantially the same. It is thereby furthermore advantageously possible to enable each of a plurality of second user equipments to determine one geographical distance or range of the geographical distance to the first user equipment. According to one example, the estimation related to the geographical distance or to the range of the geographical distance is indicated to a software application—for example executed on the second user equipment or on a remote server of the system—in form of a numerical value specifying an absolute or relative value of the geographical distance or in the form of an indication—in particular a single Bit indication—that the estimated distance falls within a discovery range requested by the application.

According to a preferred embodiment—in particular of the system—of the present invention, the system comprises a mobile communication network, wherein at least one of the first and second user equipment is related to the mobile communication network comprising a core network and an access network, the access network of the mobile communication network comprising at least one radio cell being served by a base station entity, the radio cell corresponding to the radio coverage area of the base station entity, wherein the system is configured such that a transmission power calibration information is transmitted by the base station entity, wherein the system is configured such that the transmission power calibration information is received by the first user equipment, the transmission power calibration information being indicative of the level of transmission power to apply, by the first user equipment, for transmitting the discovery message, wherein preferably the system is configured such that the transmission power calibration information is transmitted, by the base station entity, using a control channel, preferably the broadcast control channel or a dedicated control channel for individual control of a specific user equipment.

Thereby, it is advantageously possible to use the transmission power calibration information for determining the estimation related to the geographical distance or range of the geographical distance with relatively high precision. Preferably, the transmission power calibration information comprises a calibration table being provided by the eNB to the announcing first user equipment such that the variation of transmission distance ranges of the discovery message are reduced with respect to different first user equipments, in particular within the radio cell. Preferably, the system is configured to define a maximum level of the transmission power for each radio cell separately. According to the present invention, the use of radio cell specific transmission power calibration information, advantageously allows for avoidance of changes of the transmission distance range upon change of the radio cell by the first user equipment.

Furthermore, the present invention relates to a mobile communication network, especially adapted to be used in a system according to the present invention, for enabling an enhanced estimation, by a user equipment, of the geographical distance or of a range of the geographical distance between at least two user equipments via transmitting at least one discovery message for device to device communication between the user equipments, wherein at least one of the first and second user equipment is related to the mobile communication network comprising a core network and an access network, the access network of the mobile communication network comprising at least one radio cell being served by a base station entity, the radio cell corresponding to the radio coverage area of the base station entity, the first user equipment and the second user equipment being enabled to use a device to device communication mode (D2D mode) including proximity detection and/or discovery, wherein the mobile communication network is configured such that a transmission power calibration information is transmitted by the base station entity, wherein the system is configured such that the transmission power calibration information is received by the first user equipment, the transmission power calibration information being indicative of the level of transmission power to apply, by the first user equipment, for transmitting the discovery message, wherein preferably the system is configured such that the transmission power calibration information is transmitted, by the base station entity, using a control channel, preferably the broadcast control channel or a dedicated control channel for individual control of a specific user equipment.

It is thereby advantageously possible to provide a mobile communication network for use in a system according to the present invention, wherein a direct determination of the estimation related to the geographical distance or the range of the geographical distance between the first and user equipment and the second user equipment is realized, in particular for a determination independent of the transmission quality of signals transmitted by the mobile communication network.

Furthermore, the present invention relates to a user equipment adapted to be used in a system according to the present invention or with a mobile communication network according to the present invention, wherein the user equipment is configured to transmit at least one discovery message for device to device communication to at least one second user equipment, the user equipment and the second user equipment being enabled to use a device to device communication mode (D2D mode) including proximity detection and/or discovery, wherein the user equipment is configured such that:

the discovery message is generated by the first user equipment, wherein the discovery message comprises a transmission power information, the transmission power information being indicative of the level of the transmission power used by the first user equipment for transmitting the discovery message, the discovery message is transmitted, by the first user equipment, using a common air interface of the first user equipment and the second user equipment, wherein the level of transmission power is used by the first user equipment to transmit the discovery message.

It is thereby advantageously possible to provide a user equipment for use in a system according to the present invention, wherein a direct determination of the estimation related to the geographical distance or the range of the geographical distance between the first and user equipment and the second user equipment is realized, in particular for a determination independent of the transmission quality of signals transmitted by the mobile communication network.

Additionally, the present invention relates to a Program comprising a computer readable program code which, when executed on a computer or on a first user equipment or a second user equipment, or in part on the first user equipment and in part on the second user equipment, causes the computer or the first user equipment or the second user equipment to perform a method according to the present invention.

Additionally, the present invention relates to a computer program product for using a user equipment with a base transceiver station, the computer program product comprising a computer program stored on a storage medium, the computer program comprising program code which, when executed on a computer or on a first user equipment or a second user equipment, or in part on the first user equipment and in part on the second user equipment, causes the computer or the first user equipment or the second user equipment to perform a method according to the present invention.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 2:
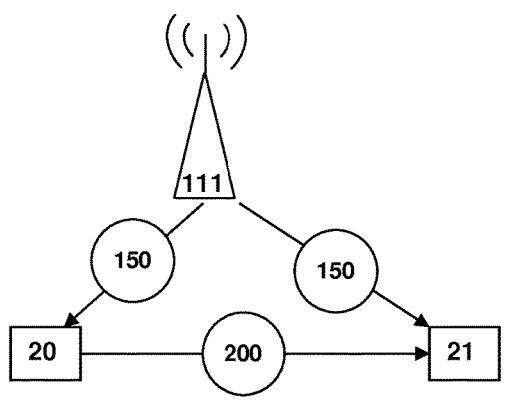

In FIG. 1, a system according an embodiment of the present invention is schematically illustrated, wherein the system comprises a first user equipment 20 and at least one second user equipment 21. The system is configured for transmitting at least one discovery message 200 (which is illustrated in FIG. 2) for device to device communication from the first user equipment 20 to the at least one second user equipment 21.

Furthermore, the system optionally comprises a mobile communication network 100, especially a public land mobile network (PLMN). The mobile communication network 100 comprises an access network 110 and a core network 120. The mobile communication network 100 is preferably a cellular telecommunications network comprising typically a plurality of network cells, wherein one network cell is represented in FIG. 1 by means of reference sign 10. The first user equipment 20 and/or the at least one second user equipment 21 is/are preferably camping on the mobile communication network 100 within the network cell 10, i.e. the first user equipment 20 and/or the at least one second user equipment 21 are connected to or camping on a base station entity 111 serving the cell 10. According to a preferred embodiment of the present invention, the mobile communication network 100 is configured to allocate radio resources to the first user equipment 20 and/or to the at least one second user equipment 21 for use of the radio resources by the first user equipment 20 and/or the at least one second user equipment 21 for device to device discovery and/or device to device communication. The first user equipment 20 and the second user equipment 21 are enabled to use a device to device communication mode (D2D mode) including proximity detection and/or discovery and/or device to device communication.

The system is preferably adapted to estimate the geographical distance or to estimate a range of the geographical distance between at least two user equipments via transmitting at least one discovery message 200 (see FIG. 2) for device to device communication from the first user equipment 20 to the at least one second user equipment 21. The system comprises a first user equipment being adapted to generate the discovery message 200 such that the discovery message 200 comprises a transmission power information. The transmission power information is indicative of the level of the transmission power used by the first user equipment 20 for transmitting the discovery message 200. Subsequent to the generation of the discovery message 200, the first user equipment 20 transmits the discovery message 200 and uses the level of the transmission power being indicated by the transmission power information.

The system further comprises the second user equipment 21 being adapted to receive the discovery message 200—which comprises the transmission power information—and to determine a level of reception power. The level of reception power is related to the reception of the discovery message 200 by the second user equipment 21. Furthermore, the second user equipment 21 is adapted to determine, based on the received transmission power information and the determined level of reception power, an estimation related to the geographical distance, or to a range of the geographical distance out of a plurality of different ranges of the geographical distance between the first user equipment 20 and the second user equipment 21.

In FIG. 2, a system according to a preferred embodiment of the present invention is schematically illustrated. According to the embodiment shown in FIG. 2, the base station entity 111 of the system is adapted to transmit a transmission power calibration information 150. The transmission power calibration information 150 is preferably transmitted, by the base station entity 111, using a control channel, preferably the broadcast control channel or using a dedicated control channel for individual control of a specific user equipment. The transmission power calibration information is indicative of the level of transmission power to apply, by the first user equipment 20, for transmitting the discovery message 200. Preferably, the transmission power calibration information is used by the system to control a transmission distance range of the discovery message.

According to an alternative preferred embodiment, the transmission power calibration information 150 is transmitted to the first user equipment 20 such that the transmission power calibration information 150 is received by the first user equipment 20. In particular, the transmission power calibration information 150 is received only by the first user equipment, if the broadcast control channel is used and only the first user equipment 20 is adapted to listen to the broadcast control channel, and/or if the dedicated control channel for individual control of a the first user equipment is used. According to still another alternative preferred embodiment, the transmission power calibration information 150 is transmitted to both, the first user equipment 20 and the second user equipment 21, wherein preferably the broadcast control channel is used. In case that the transmission power calibration information 150 is also received by the second user equipment 21, the transmission power calibration information is configured such that the transmission power calibration information is indicative of radio conditions within the radio cell. It is thereby advantageously possible that the estimation related to the geographical distance or to a range of the geographical distance between the first user equipment 20 and the second user equipment 21 is determined—in particular with a relatively high precision—based on the transmission power calibration information, and on the received transmission power information and the determined level of reception power.

According to an embodiment of the present invention, the transmission power calibration information is used in the form of a calibration table, wherein the calibration table is adjusted, by the system, to a type of the radio cell, wherein, for example, the type of the radio cell is a rural type or an urban type or another type.

According to a preferred embodiment of the present invention, the transmission power calibration information 150 refers to at least a first level of transmission power, a second level of transmission power and a third level of transmission power, to be alternatively applied, by the first user equipment 20, for transmitting the discovery message 200. The first level of transmission power refers to a first transmission distance range of the discovery message 200—for example a short range. The second level of transmission power refers to a second transmission distance range of the discovery message 200—for example a medium range. The third level of transmission power refers to a third transmission distance range of the discovery message 200—for example a long range.

For example, in case that the transmission power calibration information is used for a first type of radio cell 10—for example a rural radio cell 10 having relatively good radio conditions—a smaller first, second and third level of transmission power is used for the first, second and third transmission distance range, respectively, than in case that the transmission power calibration information is used for a second type of radio cell 10—for example an urban radio cell 10 having relatively poor radio conditions, in particular due to larger densities of interference sources. It is thereby advantageously possible to realize the same first, second and third transmission distance range independent of the type of the radio cell.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for estimating a geographical distance or a range of the geographical distance between at least two user equipments via transmitting a discovery message for device to device communication from a first user equipment to a second user equipment, the first user equipment and the second user equipment being enabled to use a device to device communication mode including proximity detection and/or discovery, wherein the method comprises the following steps:
   in a first step, generating, by the first user equipment, the discovery message, wherein the discovery message comprises transmission power information, the transmission power information being indicative of a level of transmission power for transmitting the discovery message;
   in a second step, transmitting, by the first user equipment, the discovery message using a common air interface of the first user equipment and the second user equipment, wherein the level of transmission power is used by the first user equipment to transmit the discovery message; and
   in a third step, receiving, by the second user equipment, the discovery message comprising the transmission power information and determining a level of reception power;
   wherein the method further comprises:
   determining, by the second user equipment, based on the received transmission power information and the determined level of reception power, an estimation related to the geographical distance between the first user equipment and the second user equipment, or to a range of the geographical distance out of a plurality of different ranges of the geographical distance between the first user equipment and the second user equipment;
   wherein the first user equipment and the second user equipment are related to a mobile communication network comprising a core network and an access network, the access network of the mobile communication network comprising a radio cell being served by a base station entity, the radio cell corresponding to the radio coverage area of the base station entity, wherein transmission power calibration information is transmitted by the base station entity, wherein the transmission power calibration information is received by the first user equipment, the transmission power calibration information being indicative of the level of transmission power to apply, by the first user equipment, for transmitting the discovery message.

2. The method according to claim 1, wherein the transmission power calibration information refers to at least a first level of transmission power and to a second level of transmission power, to be alternatively applied, by the first user equipment, for transmitting the discovery message, wherein the first level of transmission power refers to a first transmission distance range of the discovery message and wherein the second level of transmission power refers to a second transmission distance range of the discovery message, the second level of transmission power and the second transmission distance range being superior to the first level of transmission power and the first transmission distance range.

3. The method according to claim 1, wherein the transmission power calibration information is also received by the second user equipment, the transmission power calibration information being indicative of radio conditions within the radio cell; and
   wherein determining the estimation related to the geographical distance between the first user equipment and the second user equipment, or to the range of the geographical distance between the first user equipment and the second user equipment, is further based on the transmission power calibration information.

4. The method according to claim 1, wherein information indicative of radio conditions within the radio cell is transmitted by the base station entity; and
   wherein determining the estimation related to the geographical distance between the first user equipment and the second user equipment, or to the range of the geographical distance between the first user equipment and the second user equipment, is further based on the information indicative of the radio conditions within the radio cell.

5. The method according to claim 1, wherein the discovery message comprises an indication of a geographic location of the first user equipment and/or identification information identifying the first user equipment and/or the subscriber of the first user equipment and/or an application and/or a category.

6. The method according to claim 1, wherein the discovery message comprises, besides the transmission power information, an indication that the discovery message comprises a-transmission power information.

7. The method according to claim 1, wherein the discovery message comprises an expression according to the 3GPP Proximity Services (ProSe) standard.

8. The method according to claim 7, wherein the discovery message comprises, besides the expression, header information, wherein the header information comprises the transmission power information.

9. The method according to claim 7, wherein the discovery message comprises, besides the expression and header information, additional information, wherein the additional information comprises the transmission power information.

10. A system for estimating a geographical distance or a range of the geographical distance between at least two user equipments via transmitting a discovery message for device to device communication from a first user equipment to a second user equipment, the system comprising the first user equipment and the second user equipment, the first user equipment and the second user equipment being enabled to use a device to device communication mode including proximity detection and/or discovery, wherein the system comprises:
   the first user equipment, configured to: generate the discovery message, wherein the discovery message comprises transmission power information, the transmission power information being indicative of a level of the transmission power for transmitting the discovery message; and transmit the discovery message, using a common air interface of the first user equipment and the second user equipment, using the level of transmission power; and the second user equipment, configured to: receive the discovery message comprising the transmission power information; determine a level of reception power; and determine, based on the received transmission power information and the determined level of reception power, an estimation related to the geographical distance between the first user equipment and the second user equipment, or to a range of the geographical distance out of a plurality of different ranges of the geographical distance between the first user equipment and the second user equipment;

wherein the system further comprises:

a mobile communication network, comprising a core network and an access network, the access network of the mobile communication network comprising a radio cell being served by a base station entity, the radio ell corresponding to the radio coverage area of the base station entity;

wherein at least one of the first user equipment and the second user equipment is related to the mobile communication network;

wherein the base station entity is configured to transmit transmission power calibration information to the first user equipment, the transmission power calibration information being indicative of the level of transmission power to apply, by the first user equipment, for transmitting the discovery message.

11. A user equipment, comprising a processor and a non-transitory computer-readable medium having processor-executable instructions stored thereon, wherein the processor-executable instructions, when executed, facilitate the following:

generating a discovery message, wherein the discovery message comprises a transmission power information, the transmission power information being indicative of a level of transmission power for transmitting the discovery message; and transmitting the discovery message using a common air interface of the user equipment and a second user equipment, using the level of transmission power, to facilitate the second user equipment receiving the discovery message comprising the transmission power information and determining a level of reception power and determining, based on the received transmission power information and the determined level of reception power, an estimation related to the geographical distance between the first user equipment and the second user equipment, or to a range of the geographical distance out of a plurality of different ranges of the geographical distance between the first user equipment and the second user equipment;

wherein the user equipment and the second user equipment are related to a mobile communication network comprising a core network and an access network, the access network of the mobile communication network comprising a radio cell being served by a base station entity, the radio cell corresponding to the radio coverage area of the base station entity;

wherein transmission power calibration information from the base station entity is indicative of the level of transmission power to apply for transmitting the discovery message.

12. A non-transitory computer-readable medium having processor-executable instructions stored thereon, wherein the processor-executable instructions, when executed, facilitates:

generating, by a user equipment, a discovery message, wherein the discovery message comprises transmission power information, the transmission power information being indicative of a level of transmission power for transmitting the discovery message; and transmitting, by the user equipment, the discovery message using a common air interface of the user equipment and a second user equipment, using the level of transmission power, to facilitate the second user equipment receiving the discovery message comprising the transmission power information and determining a level of reception power and determining, based on the received transmission power information and the determined level of reception power, an estimation related to the geographical distance between the first user equipment and the second user equipment, or to a range of the geographical distance out of a plurality of different ranges of the geographical distance between the first user equipment and the second user equipment;

wherein the user equipment and the second user equipment are related to a mobile communication network comprising a core network and an access network, the access network of the mobile communication network comprising a radio cell being served by a base station entity, the radio cell corresponding to the radio coverage area of the base station entity;

wherein transmission power calibration information from the base station entity is indicative of the level of transmission power to apply for transmitting the discovery message.

* * * * *